United States Patent
Jansson et al.

(10) Patent No.: US 9,584,759 B2
(45) Date of Patent: Feb. 28, 2017

(54) DETERMINATION OF BIT RATE REQUEST

(71) Applicant: Telefonaktiebolaget LM Ericsson (publ), Stockholm (SE)

(72) Inventors: Fredrik Jansson, Sundbyberg (SE); Erlendur Karlsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/118,003

(22) PCT Filed: Feb. 14, 2014

(86) PCT No.: PCT/SE2014/050180
§ 371 (c)(1),
(2) Date: Aug. 10, 2016

(87) PCT Pub. No.: WO2015/122810
PCT Pub. Date: Aug. 20, 2015

(65) Prior Publication Data
US 2017/0019631 A1    Jan. 19, 2017

(51) Int. Cl.
*H04N 7/14*    (2006.01)
*H04L 12/853*    (2013.01)
*H04L 1/00*    (2006.01)

(52) U.S. Cl.
CPC ............ *H04N 7/148* (2013.01); *H04L 1/0002* (2013.01); *H04L 47/2416* (2013.01)

(58) Field of Classification Search
CPC combination set(s) only.
See application file for complete search history.

(56) References Cited

U.S. PATENT DOCUMENTS

| | | | |
|---|---|---|---|
| 2001/0002919 A1* | 6/2001 | Sourour | H04B 1/7075 375/150 |
| 2007/0183303 A1 | 8/2007 | Pi et al. | |

(Continued)

FOREIGN PATENT DOCUMENTS

| | | |
|---|---|---|
| EP | 1 434 378 A2 | 6/2004 |
| WO | WO 2008/086509 A2 | 7/2008 |

OTHER PUBLICATIONS

International Search Report and Written Opinion of the International Searching Authorization, Application No. PCT/SE2014/050180, Dec. 10, 2014.

*Primary Examiner* — Joseph J Nguyen
(74) *Attorney, Agent, or Firm* — Myers Bigel, P.A.

(57) ABSTRACT

There is provided determination of a bit rate request (BRR) for a multimedia encoder of an electronic device. First bit rate information is received from a receiver of multimedia content. The multimedia content is generated by the multimedia encoder and transmitted by the electronic device on a transmission link of the electronic device to the receiver. The first bit rate information is related to the transmission link. Second bit rate information relating to a reception link of the electronic device is acquired. A set of properties of the transmission link and the reception link is determined. A combined BRR is determined for the multimedia encoder as a function of the first bit rate information and the second bit rate information, wherein the function depends on the set of properties. The combined BRR is provided to the multimedia encoder.

21 Claims, 4 Drawing Sheets

(56) References Cited

U.S. PATENT DOCUMENTS

| | | | |
|---|---|---|---|
| 2009/0021572 A1* | 1/2009 | Garudadri | H04L 47/10 348/14.01 |
| 2009/0207905 A1* | 8/2009 | Tomita | H04L 29/12066 375/240.01 |
| 2010/0158126 A1* | 6/2010 | Bai | H04N 21/234309 375/240.16 |
| 2010/0316066 A1* | 12/2010 | Leung | H04N 21/44209 370/468 |
| 2012/0086767 A1 | 4/2012 | Lau et al. | |
| 2014/0056356 A1* | 2/2014 | Yu | H04N 19/51 375/240.16 |

\* cited by examiner

DETERMINATION OF BIT RATE REQUEST

CROSS REFERENCE TO RELATED APPLICATION

This application is a 35 U.S.C. §371 national stage application of PCT International Application No. PCT/SE2014/050180, filed on Feb. 14, 2014, the disclosure and content of which is incorporated by reference herein in its entirety. The above-referenced PCT International Application was published in the English language as International Publication No. WO 2015/122810 A1 on Aug. 20, 2015.

TECHNICAL FIELD

Embodiments presented herein relate to bit rate requests, and particularly to a method, an electronic device, a computer program, and a computer program product for determining a bit rate request for a multimedia encoder of an electronic device.

BACKGROUND

In communication networks, there is always a challenge to obtain good performance and capacity for a given communications protocol, its parameters and the physical environment in which the communication network is deployed.

Further, the area of communications has evolved rapidly over the last years; from traditional person-to-person phone calls to many and more advanced services; such as multimedia sessions involving e.g., multiparty video conferencing. Such services put extensive requirements on the communications network and when multimedia such as audio and video are transmitted from one device to another over the communications network, it is not uncommon that the capacity of the communications network is lower than what is required by the multimedia session to give the end-user a desired user experience. One non-limiting example is video telephony over a 3G network where on the one hand, High Definition (HD) video transmission with a bit rate of several Mbit/s could be needed to deliver a high quality end-user experience, whilst on the other hand, such a high bit rate could by the communications network only be supported under benign conditions.

As a result of varying network performance, running a multimedia session service with a high fixed bit rate over wireless communications networks (or other communications networks with time-varying throughput characteristics) may lead to quality problems and unsatisfied end-users. To mitigate this some existing services have implemented mechanisms to cope with temporarily congested networks by means of rate adaptation. Through various techniques the multimedia stream is adapted with the goal to suit present conditions of the communications channel.

In general terms, it is common that the end-user equipment and/or the network nodes of the communications network measures the perceived end-user quality or other Quality of Service (QoS) parameters such as media delay, delay jitter and packet loss that may have a correlation with the perceived end-user quality. These measurements may then be used to control the multimedia bit rate, and thus the bandwidth consumption, used by the electronic device for transmitting the multimedia stream.

However, the above outlined procedure for controlling the multimedia bit rate may not be able adapt the bit rate fast enough when considering fast time-varying channel conditions of the communications channel which may have an impact on the transmission of the multimedia. Hence, there is still a need for improved control of bandwidth consumption and/or end-user quality usable during a multimedia communications session, such as a video conferencing service.

SUMMARY

An object of embodiments herein is to provide improved control of bandwidth consumption and/or end-user quality usable during a multimedia communications session, such as a video conferencing service.

Producing a bit rate not matching the bit rate offered by the communications channel may result in a degraded end-user experience, especially if the produced bit rate is higher than what the communications channel can handle. The inventors of the enclosed embodiments have realized that the longer such a mis-matched bit rate is produced the worse the end-user experience will be. A particular object is therefore to provide improved control of bandwidth consumption and/or end-user quality usable during a multimedia communications session, such as a video conferencing service, wherein the bandwidth consumption is adapted to varying network conditions in a time-efficient way.

According to a first aspect there is presented a method for determining a bit rate request (BRR) for a multimedia encoder of an electronic device. The method is performed by the electronic device. The method comprises receiving first bit rate information from a receiver of multimedia content, the multimedia content being generated by the multimedia encoder and transmitted by the electronic device on a transmission link of the electronic device to the receiver, the first bit rate information relating to the transmission link. The method comprises acquiring second bit rate information relating to a reception link of the electronic device. The method comprises determining a set of properties of the transmission link and the reception link. The method comprises determining a combined BRR for the multimedia encoder as a function of the first bit rate information and the second bit rate information, wherein the function depends on the set of properties. The method comprises providing the combined BRR to the multimedia encoder.

Advantageously this provides improved control of bandwidth consumption during a multimedia communications session.

Advantageously this provides improved control of bandwidth consumption during a multimedia communications session in a time-efficient way.

Advantageously this may improve network efficiency for multimedia services.

Advantageously this may improve the Quality of Service, and thus the end-user experience.

Advantageously this may enable network costs to be reduced.

Advantageously this may enable an efficient way to handle significant drops in channel quality, such as during handovers in cellular communications networks.

According to a second aspect there is presented an electronic device (12a, 12c) for determining a bit rate request (BRR) for a multimedia encoder of the electronic device. The electronic device comprises a processing unit. The processing unit is arranged to receive first bit rate information from a receiver of multimedia content, the multimedia content being generated by the multimedia encoder and transmitted by the electronic device on a transmission link of the electronic device to the receiver, the first bit rate information relating to the transmission link. The processing unit is arranged to acquire second bit rate information relating to a reception link of the electronic device. The processing unit is arranged to determine a set of properties of the transmission link and the reception link. The processing unit is arranged to determine a combined BRR for the multimedia encoder as a function of the first bit rate information and the second bit rate information, wherein the function depends on the set of properties. The processing unit is arranged to provide the combined BRR to the multimedia encoder.

According to a third aspect there is presented a computer program for determining a bit rate request for a multimedia encoder of an electronic device, the computer program comprising computer program code which, when run on the electronic device causes the an electronic device to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
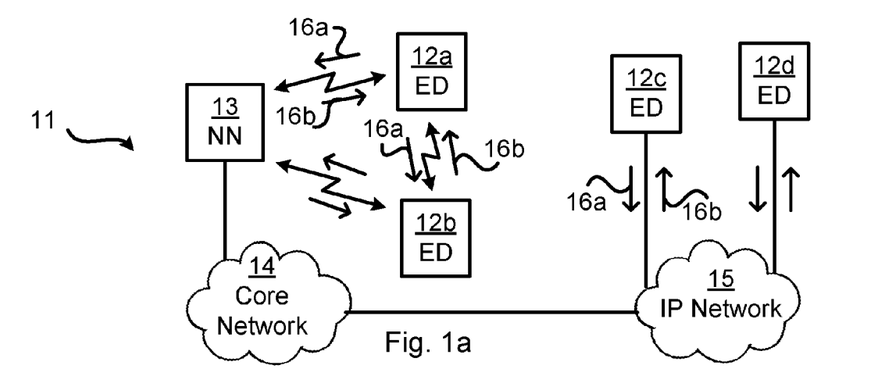
FIG. 1a schematically illustrates a general communications network where embodiments presented herein may apply.

FIG. 1a shows a schematic overview of an exemplifying communications network 11 where embodiments presented herein can be applied. The communications network 11 comprises a network node (NN) 13 providing network coverage over cells (not shown). An electronic device (ED) 12a, 12b positioned in a particular cell is thus provided network service by the network node 13 serving that particular cell. As the skilled person understands, the communications network 11 may comprise a plurality of network nodes 13 and a plurality of UEs 12a, 12b operatively connected to at least one of the plurality of network nodes 13.

The network node 13 is operatively connected to a core network 14. The core network 14 may provide services and data to the electronic device 12a, 12b operatively connected to the network node 13 from an external Internet Protocol (IP) packet switched data network 15. At least parts of the communications network 11 may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, HSPA (High Speed Packet Access), etc., as long as the principles described hereinafter are applicable. An electronic device 12c, 12d may further have a wired connection to the external IP packet switched data network 15.

Examples of electronic devices 12a, 12b, 12c, 12d include, but are not limited to end-user equipment such as mobile phones, tablet computers, laptop computers, and stationary computers. The electronic device 12a, 12b, 12c, 12d may alternatively be a server. In general terms, an electronic device 12a, 12b, 12c, 12d as herein disclosed may have either a wireless connection, or a wired connection, or both a wireless connection and a wired connection to the IP packet switched network 15. Hence the communications network 11 may comprise any combinations of purely wirelessly connected electronic devices 12a, 12b purely wired connected electronic devices 12c, 12d, and electronic devices 12a, 12b, 12c, 12d with both wireless and wired connections. In FIG. 1a transmission links from the electronic devices 12a, 12c are schematically illustrated at reference 16a and reception links to the electronic devices 12a, 12c are schematically illustrated at reference 16b.

One example of services and data which may be communicated through the communications system 11 is multimedia communications. In multimedia communications multimedia streams are communicated between two electronic devices 12a, 12b, 12c, 12b (such as from electronic device 12a to electronic device 12b on transmission link 16a, or vice versa, such as from electronic device 12b to electronic device 12a on reception link 16b) or between a server of the IP network 15 and at least one electronic device 12a, 12b, 12c, 12d (such as from the server to at least one electronic device 12a, 12b, 12c, 12d or from a at least one electronic device 12a, 12b, 12c, 12d to the server). The multimedia stream may comprise payload data in the form of audio and video content. The audio and video content may be synchronized. As the skilled person understands the multimedia streams may comprise further payload data.

Figure 1B:
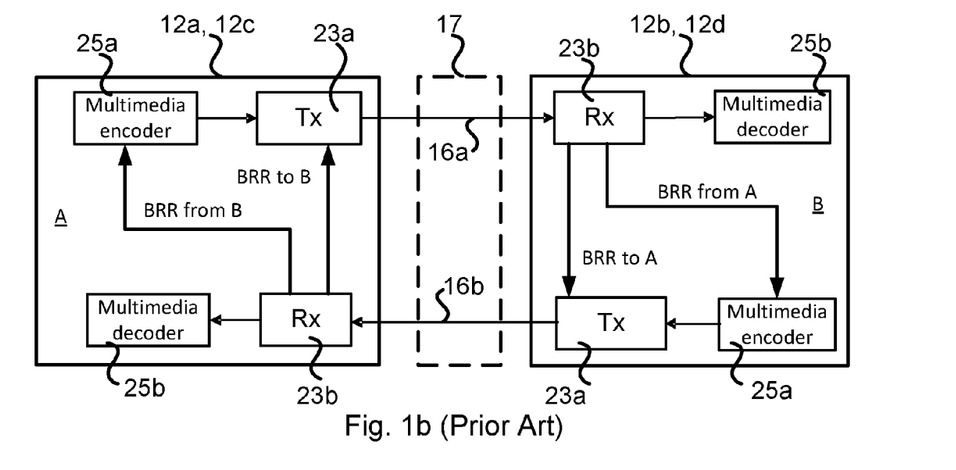
FIG. 1b schematically illustrates parts of a communications network according to prior art.

FIG. 1b schematically illustrates parts of a communications network according to prior art. In more detail, FIG. 1b schematically illustrates a first electronic device 12a, 12c acting as a transmitter of multimedia content and a second electronic device 12b, 12d acting as a receiver of the transmitted multimedia content. The multimedia content is transmitted over a communications channel 17 comprising a transmission link 16a and a reception link 16b. The electronic device 12a, 12b, 12c, 12d comprises a transmitter (Tx) and receiver (Rx) for communication with another electronic device 12a, 12b, 12c, 12d. Transmitters 23a and receivers 23b are as such known in the art and will therefore not be further described herein. The electronic device 12a, 12c further comprises a multimedia encoder 25a for encoding multimedia. The multimedia encoder 25a may thus comprise an audio encoder and/or a video encoder. The electronic device 12a, 12c further comprises a multimedia decoder 25b for decoding multimedia. The multimedia decoder 25b may thus comprise an audio decoder and/or a video decoder. Multimedia encoders 25a and decoders 25b are as such known in the art and will therefore not be further described herein. The electronic device 12a, 12c is arranged to transmit multimedia content (as encoded by the multimedia encoder 25a), via the transmitter and over the communications channel 17, to (the receiver of) the electronic device 12b, 12d. The received multimedia content may then be provided to the multimedia decoder 25b for decoding. The received multimedia content may additionally or alternatively be stored in a storage medium for later decoding. The multimedia content is transmitted using a bit rate as specified by a bit rate request (BRR). The BRR is determined by the electronic device 12b, 12d and transmitted from the electronic device 12b, 12d to the electronic device 12a, 12c over the communications channel 17. Commonly, the electronic device 12a, 12c is arranged to transmit multimedia content over a non-ideal communications channel 17 and the electronic device 12b, 12d intended to receive the multimedia content measures the quality of the received bit stream. Currently, the results of the measurement may be translated into a BRR that is provided to the electronic device 12a, 12c. For example, if the electronic device 12b, 12d detects that the bit rate used for transmitting the multimedia content most likely is too high it will transmit a BRR to the electronic device 12a, 12c to lower its bit rate. Common parameters to measure are inter-arrival delay, delay jitter and packet loss. Alternatively the electronic device 12b, 12d may transmit the measurement results to the electronic device 12a, 12c, and the electronic device 12a, 12c may then by itself obtain a corresponding BRR from the received measurement results. Principles of how the BRR is determined may be defined by an adaptation scheme.

Given that the measurements indicate that there is a certain bit rate available for transmitting multimedia content the electronic device 12a, 12c has to decide on how to allocate the available number of bits for a given time slot. For example, the electronic device 12a, 12c may be arranged to determine how many bits to allocate for audio content and how many bits to allocate for video content. For example, the electronic device 12a, 12c may be arranged to determine how many bits to allocate for different video and/or audio codec parameters. For example, the video bit rate could be lowered by using a coarser quantization in the video encoder but it can also be lowered by reducing the resolution and/or the video frame rate.

To achieve a good end user experience, the adaptation scheme (inter alia used for determining a BRR for the multimedia encoder 25a) should be able to follow rapid changes in the channel throughput, especially in cases with a sudden significant drop in throughput. A multimedia encoder 25a producing a too high bitrate will severely degrade the user experience. In general terms, the time it takes for the adaptation scheme to react on changes of the communications channel 17 affecting the throughput may be split into two parts: the time it takes to detect the change in throughput, and the time it takes for the electronic device 12b, 12d to send the request for a new bit rate to the electronic device 12a, 12i (or vice versa).

In general terms, the first part will depend on the actual implementation of the adaptation scheme and will in general be a compromise between fast reaction and stability. In general terms, the minimum time for the second part will be the one way transmission delay. The protocols used for the transmission may also introduce additional delay.

For a real time service, e.g. video conferencing, the one way transmission delay generally has to stay below about 200-300 ms in order to render an acceptable user experience.

Figure 6:
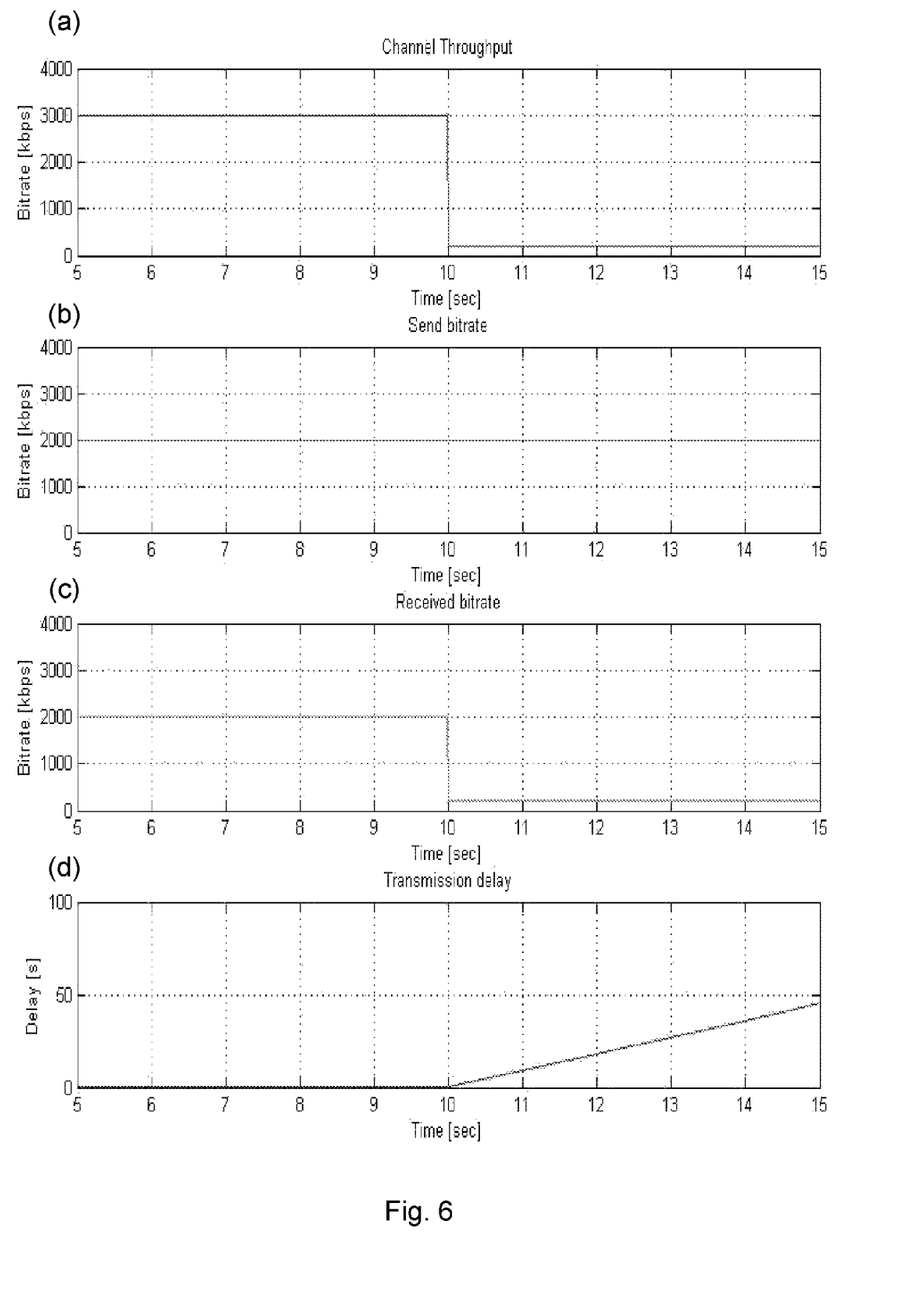
FIG. 6 schematically illustrates examples of throughput/quality over time.

The communications channel 17 (which in reality can be a combination of physical and logical channels with different characteristics e.g WiFi-ADSL-Internet-HSPA) between the electronic device 12a, 12c and the electronic device 12b, 12d will handle excessive bit rates in different ways. One way to handle excessive bit rates is to allowing any packet coming in to the sending part of a bottleneck channel to be lost if the communications channel 17 is still busy handling previous packets. Another way to handle excessive bit rates is to configure a sending buffer in which incoming packets are placed; sending of the packets then takes place whenever the communications channel 17 has available throughput capacity and the oldest packet in the buffer is sent first. In this case no packets will be dropped but the transmission delay increases during the over-use period. FIG. 6(a) schematically illustrates channel throughput in terms of bitrate in kbits per second as a function of time in seconds according to one scenario. FIG. 6(b) schematically illustrates the send bitrate in terms of bitrate in kbits per second as a function of time in seconds according to the same scenario as in FIG. 6(a). FIG. 6(c) schematically illustrates the received bitrate in terms of bitrate in kbits per second as a function of time in seconds according to the same scenario as in FIG. 6(a). FIG. 6(d) schematically illustrates the resulting transmission delay in terms of bitrate in kbits per second as a function of time in seconds according to the same scenario as in FIG. 6(a).

In reality most communications channels 17 may handle excessive bit rates according to a combination of the above; the sending buffer will have a limited size and if the communications channel 17 is continuously over used the buffer will eventually be full and packets will be dropped.

As an example, consider a case with total symmetry between the transmission link 16a and the reception link 16b and where the channel throughput suddenly drops by a factor of 10 below the bit rate used by the multimedia encoder 25a, such as a drop from 2 Mbit/s to 200 kb/s for a video telephony service, and that the detection of the throughput change takes about 200 ms. In reality the detection may be longer.

Assume further that the bitrate of 2 Mbit/s is divided between transmitting encoded video at 1.9 Mbits/s and transmitting encoded audio at 100 kbits/s, and that the video frame rate is 25 frames per second (i.e., a frame period of 40 m) and the audio frame rate is 50 frames per second (i.e., a frame period of 20 ms). The average video frame (V) of the transmitted multimedia content will thus have a size of 76 kbits and the average audio frame (A) will thus have a size of 2 kbits.

For a communications channel 17 with a sending buffer, the amount of multimedia content added to the buffer over a 200 ms time span will be 5 video frames and 10 audio frames, distributed as illustrated in Table 1 below, totaling 400 kbits.

TABLE 1

Media frames added to buffer during a 200 msec time interval.

| V | A | A | V | A | A | V | A | A | V | A | A | V | A | A |
|---|---|---|---|---|---|---|---|---|---|---|---|---|---|---|
| 76 | 2 | 2 | 76 | 2 | 2 | 76 | 2 | 2 | 76 | 2 | 2 | 76 | 2 | 2 |

With a channel throughput of 200 kbits/s the amount of data removed from the buffer is (where "sec" is short for seconds):

$$\left(200\frac{kbits}{\sec}\right)*(0.2\ \sec) = 40\ kbits$$

This leaves 360 kbits in the buffer. The time it will take to remove those 360 kbits from the buffer is:

$$\frac{360\ kbits}{200\ kbits/\sec} = 1.8\ \sec$$

which is the accumulated delay over the 200 ms time span. A time delay of 1.8 seconds in the video signal will in most practical situations degrade the end-user quality of experience.

For the audio part, the delay between two audio frames (assuming a video frame sandwiched there between) will be:

$$\frac{78\ kbits}{200\ kbits/\sec} = 390m\ \sec$$

The true audio frame period should be 20 ms; the audio decoder at the receiver side will need to deliver a 20 ms audio segment every 20 ms, but this will be difficult, or even impossible, to achieve no matter what algorithms is used for error concealment and time scaling of the audio signal. As a result thereof the audio signal delivered at the receiver may be unintelligible.

If on the other hand the communications channel 17 does not have a sending buffer, 9 out of 10 packets will be lost and the likelihood that the BRR will be received by the electronic device 12a, 12c is considered low. For example, the BRR is commonly transmitted over the same communications channel 17 as the packets comprising encoded multimedia content. Thus, any packet loss occurring on the communications channel 17 may not only affect the transmission of the packets comprising encoded multimedia content but also affect the transmission of the BRR. Further, depending on the adaptation scheme there may be additional delays until a BRR will reach the electronic device 12a, 12c.

The embodiments disclosed herein relate to determining a bit rate request (BRR) for a multimedia encoder 25a of an electronic device 12a, 12c. In order to determine the BRR there is provided an electronic device, a method performed by the electronic device, a computer program comprising code, for example in the form of a computer program product, that when run on an electronic device, causes the electronic device to perform the method.

As will be further disclosed below, information about both the transmission link 16a and the reception link 16b, and possible also a relation there between, is used to cut down the response time in the adaptation of the BRR, thereby enabling the bandwidth consumption to be timely reduced and at the same time improving the end-user experience.

Figure 1C:
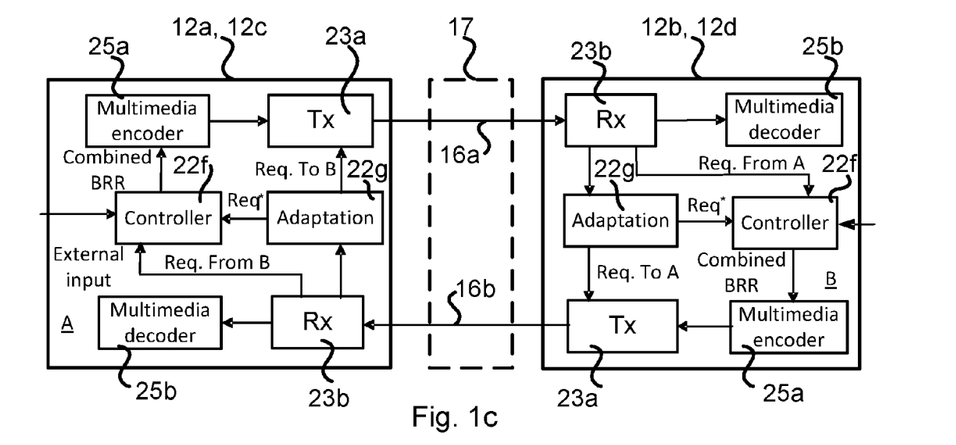
FIG. 1c schematically illustrates parts a communications network according to an embodiment.

FIG. 1c schematically illustrates parts a communications network according to an embodiment. The electronic devices 12a, 12b, 12c, 12d of FIG. 1c are similar to the electronic device 12a, 12b, 12c, 12d of FIG. 1b and additionally comprises a controller unit 22f and an adaptation unit 22g. The multimedia decoder 25b is arranged to decode received multimedia content. The functionality of the controller unit 22f and the adaptation unit 22g is based on the understanding that under such condition where it is likely that the quality and throughput of the two links 16a, 16b, are highly correlated the measurement made by the electronic device 12a, 12c (electronic device "A") can be used to control the multimedia encoder 25a of the electronic device 12a, 12c and not only the multimedia encoder 25a of the electronic device 12b, 12d (electronic device "B"). This is indicated in FIG. 1c by the Req* signal as determined by the adaptation unit 22g and used by the controller unit 22f. The controller unit 22f may be arranged to combine the bit rate request (Req to A) from the electronic device 12c, 12d with the request Req* determined based on the receive link 16b. The Req* signal may be identical to request Req to B that is sent to the electronic device 12c, 12d but it does not have to be identical; the Req* signal could for example be a scaled version of the Req to B signal. The controller unit 22f may also utilize auxiliary external input information to determine if the two links 16a, 16b are correlated. Examples of such information include, but are not limited to, the type of network used, such as whether wired or radio based communications links are used. The reaction time will be decreased since one electronics device 12a, 12c does not have to wait for another electronics device 12b, 12d to explicitly request a rate change of the multimedia encoder 25a. If the two links 16a, 16b would experience an identical drop in throughput this would mean that the transmission time part of the reaction time would be reduced to zero. Further functionality of the controller unit 22f and the adaptation unit 22g will be disclosed below.

Figure 2A:
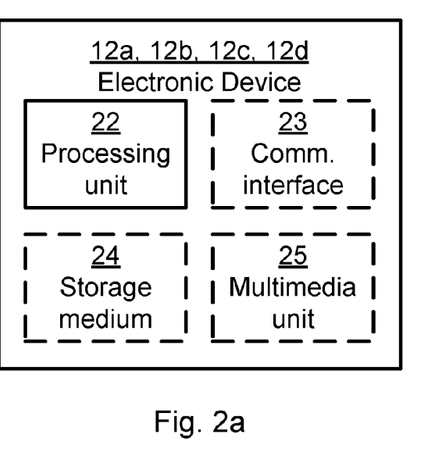
FIGS. 2a and 2b schematically illustrate examples of electronic devices according to embodiments.

FIG. 2a schematically illustrates, in terms of a number of functional modules, the components of an electronic device 12a, 12b, 12c, 12d according to an embodiment. A processing unit 22 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 3), e.g. in the form of a storage medium 24. The processing unit may comprise a controller unit 22f and an adaptation unit 22g. Thus the processing unit 22 is thereby arranged to execute methods as herein disclosed. The storage medium 24 may also comprise persistent storage, which, for example, can be any single one or combination of magnetic memory, optical memory, solid state memory or even remotely mounted memory. The electronic device 12a, 12b, 12c, 12d may further comprise a communications interface 23 for receiving and transmitting data to another electronic device. The communications interface 23 may thus comprise one or more transmitters Tx 23a and receivers Rx 23b, comprising analogue and digital components and a suitable number of antennas for radio communication and/or ports for wired communication. The electronic device 12a, 12b, 12c, 12d may further comprise a multimedia unit 25. The multimedia unit 25 may comprise a multimedia encoder 25a arranged to encode multimedia content, such as a video stream and/or an audio stream, into a multimedia stream and/or a multimedia decoder 25b arranged to decode an encoder multimedia stream into multimedia content. The processing unit 22 controls the general operation of the electronic device 12a, 12b, 12c, 12d, e.g. by sending control signals to, and receiving control signals from, the communications interface 23 and the multimedia unit 25, and by retrieving stored data and instructions from the storage medium 24, as well as writing data to the storage medium 24. Other components, as well as the related functionality, of the electronic device 12a, 12b, 12c, 12d are omitted in order not to obscure the concepts presented herein.

Figure 2B:
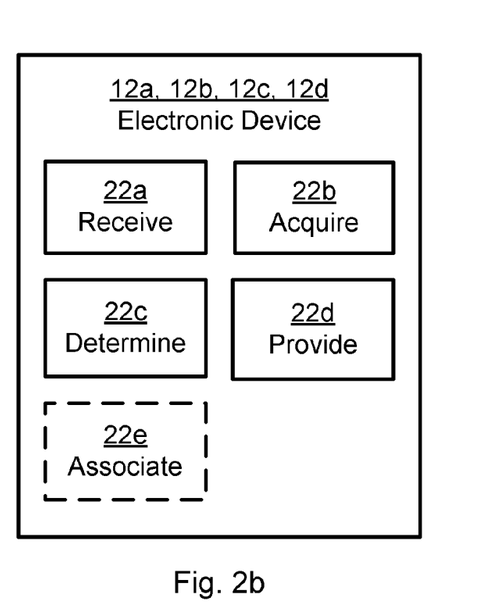

FIG. 2b schematically illustrates, in terms of a number of functional units, the components of an electronic device 12a, 12b, 12c, 12b according to an embodiment. The electronic device 12a, 12b, 12c, 12b of FIG. 2b comprises a number of functional units; a receive unit 22a, an acquire unit 22b, a determine unit 22c, and a provide unit 22d. The electronic device 12a, 12b, 12c, 12b of FIG. 2b may further comprises a number of optional functional units, such as an associate unit 22e. The functionality of each functional unit 22a-e will be further disclosed below in the context of which the functional units may be used. In general terms, each functional unit 22a-e may be implemented in hardware or in software. The processing unit 22 may thus be arranged to from the storage medium 24 fetch instructions as provided by a functional unit 22a-e and to execute these instructions, thereby performing any steps as will be disclosed hereinafter.

Figure 3:
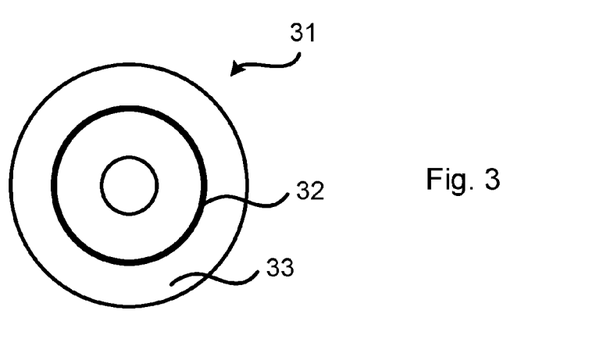
FIG. 3 schematically illustrates a computer program product according to an embodiment.
Figures 4, 5:
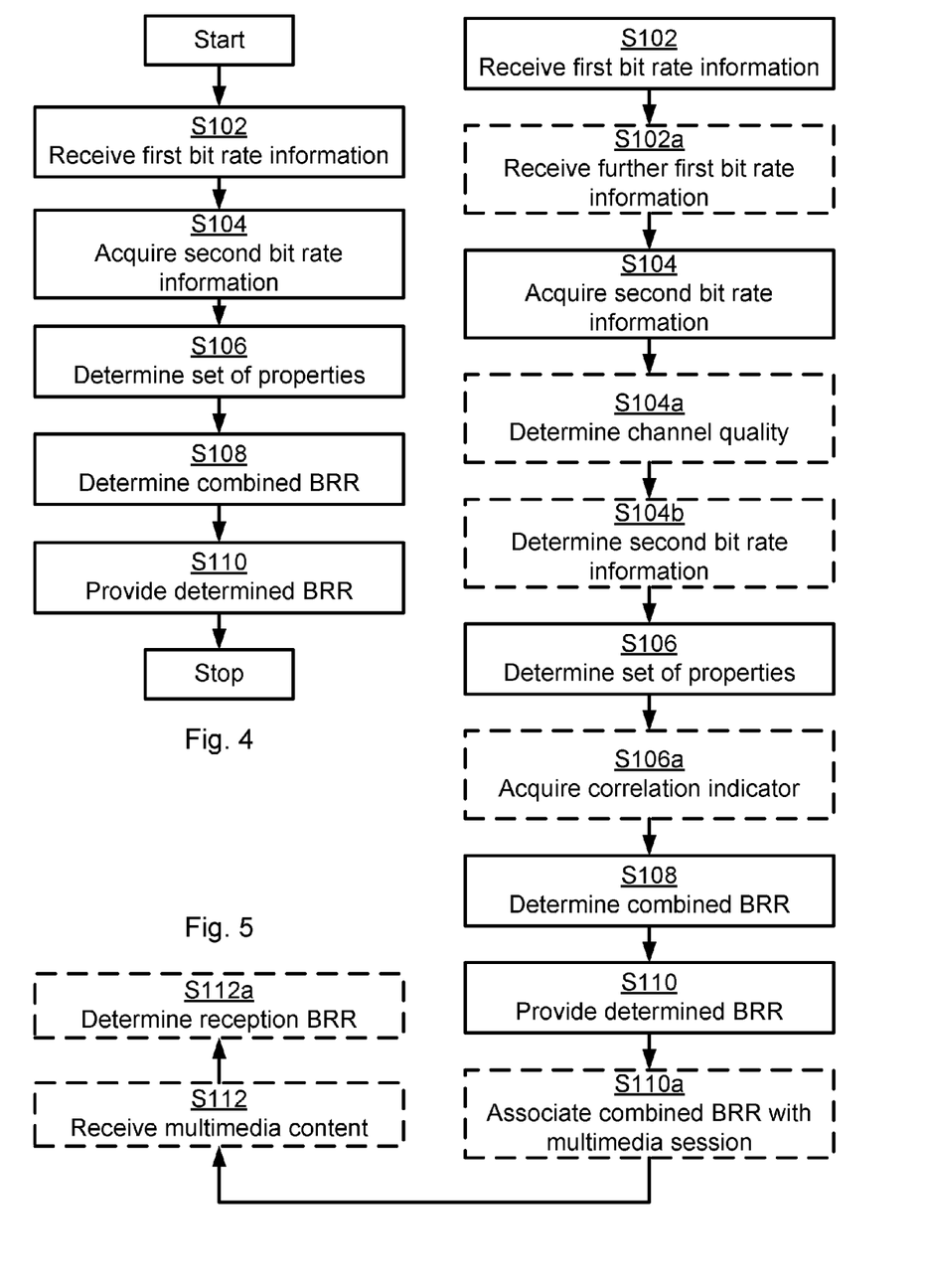
FIGS. 4 and 5 are flowcharts of methods according to embodiments.

FIGS. 4 and 5 are flow chart illustrating embodiments of methods for determining a bit rate request (BRR) for a multimedia encoder 25a of an electronic device 12a, 12c. The methods are performed by the electronic device 12a, 12b, 12c, 12d. The methods are advantageously provided as computer programs 32. FIG. 3 shows one example of a computer program product 31 comprising computer readable means 33. On this computer readable means 33, a computer program 32 can be stored, which computer program 32 can cause the processing unit 22 and thereto operatively coupled entities and devices, such as the communications interface 23, the storage medium 24, and the multimedia unit 25 to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 32 is here schematically shown as a track on the depicted optical disk, the computer program 32 can be stored in any way which is suitable for the computer program product 31.

Returning now to FIG. 1e, the enclosed embodiments relate to an electronic device 12a, 12b (the transmitting electronic device) that is arranged to generate a multimedia stream comprising e.g., audio and video content, such as audio-visual conversational data, and to communicate this multimedia stream over a communications channel 17 to another electronic device 12a, 12b (the receiving electronic device).

Reference is now made to FIG. 4 illustrating a method for determining a bit rate request (BRR) for a multimedia encoder 25a according to an embodiment.

The electronic device 12a, 12c generates and transmits encoded multimedia content to an intended receiver 12b, 12d, such as another electronic device. In response thereto the intended receiver 12b, 12d transmits bit rate information to the electronic device 12a, 12c. The processing unit 22 of the electronic device 12a, 12c is thus arranged to, in a step S102, receive first bit rate information from an intended receiver 12b, 12d of multimedia content. The multimedia content is generated by the multimedia encoder 25a and transmitted by the electronic device on a transmission link 16a of the electronic device to the intended receiver 12b, 12d. The first bit rate information relates to the transmission link.

The electronic device 12a, 12c also determines bit rate information of a reception link 16b of the electronic device 12a, 12c. The reception link 16b of the transmitting electronic device 12a, 12c may correspond to a transmission link of the intended receiver 12b, 12d. The processing unit 22 of the electronic device 12a, 12c is thus arranged to, in a step S104, acquire second bit rate information relating to a reception link 16b of the electronic device 12a, 12b.

In order to determine a combined bit rate request (BRR) for the multimedia encoder 25a the electronic device 12a, 12c considers properties of the transmission link 16a and the reception link 16b. The processing unit 22 of the electronic device 12a, 12c is thus arranged to, in a step S106, determine a set of properties of the transmission link 16a and the reception link 16b. Examples of such properties will be disclosed below.

The processing unit 22 of the electronic device 12a, 12c is then arranged to, in a step S108, determine a combined BRR for the multimedia encoder 25a as a function of the first bit rate information and the second bit rate information, where the function depends on the determined set of properties. Once the combined BRR has been determined it may be provided to the multimedia encoder 25a. The processing unit 22 of the electronic device 12a, 12c is thus arranged to, in a step S110, provide the combined BRR to the multimedia encoder 25a.

Embodiments relating to further details of determining a BRR for a multimedia encoder 25a of an electronic device 12a, 12c will now be disclosed.

The intended receiver 12b, 12d of the multimedia content may be another electronics device. In such embodiments the terms intended receiver 12b, 12d and electronics device 12b, 12d will be used interchangeably.

Reference is now made to FIG. 5 illustrating methods for determining a BRR for a multimedia encoder 25a according to further embodiments.

There may be different ways for the electronic device 12a, 12c to receive the first bit rate information as in step S102 and to acquire the second bit rate information as in step S104. Different embodiments relating thereto will now be described in turn.

For example, the first bit rate information and the second bitrate information may relate to channel quality information, CQI. That is, the first bit rate information may relate to a channel quality of the transmission link as determined by the receiving electronics device 12b, 12d of the multimedia content, and the second bit rate information may relate to a channel quality of the reception link. For example, the first bit rate information may be either channel measurements (raw or processed) or a bit rate request as issued by the electronics device 12b, 12d receiving the multimedia content. That is, the first bit rate information may comprise channel measurements or a bit rate request. The channel measurements may have been processed by the electronics device 12b, 12d receiving the multimedia content before being transmitted to the electronics device 12a, 12c.

For example, the second bit rate information may be measured. Thus, acquiring the second bit rate information in step S104 may involve the processing unit 22 of the electronic device 12a, 12c to, in an optional step S104a, determine a channel quality of the reception link from measurements made on the reception link; and, in an optional step S104b, determine the second bit rate information based on the channel quality of the reception link. For example, the second bit rate information may be assumed. Particularly, the second bit rate information may be hardcoded in the electronic device 12a, 12c.

There may be different ways to determine the set of properties of the transmission link and the reception link. Different embodiments relating thereto will now be described in turn.

In some scenarios correlation in the available throughput between the transmission link 16a and the reception link 16b cannot be assumed. However, there are some scenarios, for example when at least one of the electronic device 12a, 12c and the receiver 12b, 12b is experiencing bad radio communications coverage and where the throughput changes on the transmission link 16a and the reception link 16b will be highly correlated. Thus, the set of properties may be based on a correlation between the transmission link 16a and the reception link 16b. Further, in a case the correlation is higher than a predetermined threshold value the combined BRR may be determined as the minimum of a bit rate request comprised in the first bit rate information and a bit rate request comprised in the second bit rate information. Further, in a case the correlation is not higher than the predetermined threshold value the combined BRR may be determined as the first bit rate request comprised in the first bit rate information. Hence, in the latter case the combined BRR is determined to be the same as the BRR provided by the intended receiver 12b, 12d of the multimedia content.

There may be different ways to determine the correlation.

For example, the correlation may be based on channel quality and/or throughput. That is the correlation may be at least one of a channel quality and throughput correlation between the transmission link 16a and the reception link 16b.

For example, the processing unit 22 of the electronic device 12a, 12c may be arranged to, in an optional step S106a, acquire a correlation indicator between a channel quality indicator, CQI, value of the transmission link 16a and a CQI value of the reception link 16b. This correlation indicator may then define the set of properties used in step S108.

There may be different ways to determine, or define, the set of properties as in step S106.

For example, the set of properties may be based on what network interface that is used, Particularly, the set of properties may relates to type of network interface of the electronic device 12a, 12c used for establishing the transmission link 16a and the reception link 16b. The type of network interface may be associated with at least one radio access technology (RAT). For example, if a radio interface such as GSM, UMTS, LTE, or WiFi is used the controller unit 22f in FIG. 1c may let the Req* signal affect the combined BRR, but if a fixed connection is used it will not let Req* affect the combined BRR. Particularly, the combined BRR may be determined by a bit rate request comprised in the first bit rate information in a case the transmission link 16a is a wired transmission link.

For example, the controller unit 22f in FIG. 1c may continuously calculate the correlation between the Req* signal and the Req from B signal as received from the intended receiver 12b, 12d. If this correlation is higher than some threshold the Req* signal may influence the final bit rate request. The correlation function used could very well be a normalized correlation function.

For example, the radio signal strength could be used to influence the set of properties. For example, if the signal strength is lower than a threshold it may be assumed that there are coverage problems and thus a high correlation between the transmission link 16a and the reception link 16b and therefore then let the Req* signal influence the combined BRR. Particularly, the set of properties may be based on a radio signal strength of at least one of the transmission link 16a and the reception link 16b.

There may be different ways to determine the function used to determine the combined BRR for the multimedia encoder 25a. Different embodiments relating thereto will now be described in turn.

The function may be binary-valued or multi-valued (and hence provide a "soft" decision). For example if a correlation calculation is performed as described previously the result of the correlation can be used to scale the influence of the Req* signal in the combined BRR. Particularly, the function may determine a weighting between a bit rate request comprised in the first bit rate information and a bit rate request comprised in the second bit rate information. The combined BRR may then be determined according to the weighting. Hence, the function used in step S108 for determining the combined BRR for the multimedia encoder 25a may be based this weighting.

The combined BRR may be determined based also on further BRRs received from the intended receiver 12b, 12d. Particularly, the processing unit 22 of the electronic device 12a, 12ac may be arranged to, in an optional step S102a, receive further first bit rate information from the intended receiver 12b, 12d.

The further first bit rate information relates to the transmission link 16a. The function may depend also on the further first bit rate information. The function may further depend on a difference between the first bit rate information and the further first bit rate information. This may enable the electronic device 12a, 12c to better handle a sudden drop (or increase) in available bitrate on the transmission link 16a.

For example, in a case the available throughput on the received link 16b is dropping the controller unit 22f may first determine the combined BRR on the basis that the intended receiver 12b, 12d will be able to detect any changes in available throughput on the transmission link 16a and then send a request for a new bit rate. If this does not happen within a certain time then the throughput on the reception link 16b may be used to determine the combined BRR.

The combined BRR may be valid for a multimedia communications session (and not for transmitting/receiving other types of data to/from the intended receiver 12b, 12d). Particularly, the processing unit 22 of the electronic device 12a, 12c may be arranged to, in an optional step S110a, associate the combined BRR with a multimedia communications session of the electronic device 12a, 12c. The combined BRR may then be used for transmitting the generated multimedia content during at least a part of the multimedia communications session.

Multimedia as generated by the other electronic device 12b, 12d may be received on the reception link 16b. Particularly, the processing unit 22 of the electronic device 12a, 12c may be arranged to, in an optional step S112, receive multimedia content generated by a multimedia encoder 25a of the intended receiver 12b, 12d from the intended receiver 12b, 12d on the reception link 16b. The electronic device 12a, 12c may then generate a bit rate request (Req to B) for receiving this multimedia content. This bit rate request may in turn be used to determine the combined BRR. Particularly, the processing unit 22 of the electronic device 12a, 12c may be arranged to, in an optional step S112a, determine a reception BRR for receiving the multimedia content from the receiver on the reception link 16b. The second bit rate information may then be based on the reception BRR.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining a bit rate request (BRR) for a multimedia encoder of an electronic device, the method being performed by the electronic device, comprising the steps of:
    receiving first bit rate information from a receiver of multimedia content, the multimedia content being generated by the multimedia encoder and transmitted by the electronic device on a transmission link of the electronic device to said receiver, the first bit rate information relating to said transmission link;
    acquiring second bit rate information relating to a reception link of the electronic device;
    determining a set of properties of said transmission link and said reception link, wherein said set of properties is based on a correlation between said transmission link and said reception link;
    determining a combined BRR for the multimedia encoder as a function of said first bit rate information and said second bit rate information, wherein said function depends on said set of properties; and
    providing said combined BRR to the multimedia encoder;
    wherein said combined BRR is determined as the minimum of a bit rate request comprised in said first bit rate information and a bit rate request comprised in said second bit rate information in a case said correlation is higher than a predetermined threshold value.

2. The method according to claim 1, wherein said first bit rate information relates to a channel quality of said transmission link as determined by said receiver, and wherein said second bit rate information relates to a channel quality of said reception link.

3. The method according to claim 1, wherein acquiring said second bit rate information comprises:
    determining a channel quality of said reception link from measurements made on said reception link; and
    determining said second bit rate information based on said channel quality of said reception link.

4. The method according to claim 1, wherein said second bit rate information is hardcoded in the electronic device.

5. The method according to claim 1, wherein said function determines a weighting between a bit rate request comprised in said first bit rate information and a bit rate request comprised in said second bit rate information, and wherein said combined BRR is determined according to said weighting.

6. The method according to claim 5, wherein said function is binary-valued.

7. The method according to claim 1, wherein said combined BRR is determined as said first bit rate request comprised in said first bit rate information in a case correlation is not higher than said predetermined threshold value.

8. The method according to claim 1, wherein said correlation is at least one of a channel quality and throughput correlation between said transmission link and said reception link.

9. The method according to claim 1, wherein determining said set of properties comprises: acquiring a correlation indicator between a channel quality indicator value of said transmission link and a CQI value of said reception link.

10. The method according to claim 1, wherein said set of properties relates to type of network interface of the electronic device used for establishing said transmission link and said reception link.

11. The method according to claim 10, wherein said type of network interface is associated with at least one radio access technology (RAT).

12. The method according to claim 10, wherein said combined BRR is determined by a bit rate request comprised in said first bit rate information when said transmission link is a wired transmission link.

13. The method according to claim 1, wherein said set of properties is based on a radio signal strength of at least one of said transmission link and said reception link.

14. The method according claim 1, further comprising:
    receiving multimedia content generated by a multimedia encoder of said receiver from said receiver on said reception link.

15. The method according to claim 14, further comprising:
    determining a reception BRR for receiving said multimedia content from said receiver on said reception link;
    wherein said second bit rate information is based on said reception BRR.

16. The method according to claim 1, further comprising:
    receiving further first bit rate information from said receiver relating to said transmission link, and wherein said function depends also on said further first bit rate information.

17. The method according to claim 16, wherein said function depends on a difference between said first bit rate information and said further first bit rate information.

18. The method according to claim 1, further comprising:
    associating said combined BRR with a multimedia communications session of the electronic device, and wherein said combined BRR is used for transmitting said generated multimedia content during at least a part of said multimedia communications session.

19. The method according to claim 1, wherein said first bit rate information comprises channel measurements or a bit rate request.

20. An electronic device for determining a bit rate request (BRR) for a multimedia encoder of the electronic device, the electronic device comprising a processing unit arranged to:
    receive first bit rate information from a receiver of multimedia content, the multimedia content being generated by the multimedia encoder and transmitted by the electronic device on a transmission link of the electronic device to said receiver, the first bit rate information relating to said transmission link;

acquire second bit rate information relating to a reception link of the electronic device;

determine a set of properties of said transmission link and said reception link wherein said set of properties is based on a correlation between said transmission link and said reception link;

determine a combined BRR for the multimedia encoder as a function of said first bit rate information and said second bit rate information, wherein said function depends on said set of properties; and provide said combined BRR to the multimedia encoder wherein said combined BRR is determined as the minimum of a bit rate request comprised in said first bit rate information and a bit rate request comprised in said second bit rate information in a case said correlation is higher than a predetermined threshold value.

21. A computer program product for determining a bit rate request (BRR) for a multimedia encoder of an electronic device, the computer program product comprising a non-transitory computer readable storage medium storing computer program code which, when run on the electric device, causes the electric device to:

receive first bit rate information from a receiver of multimedia content, the multimedia content being generated by the multimedia encoder and transmitted by the electronic device on a transmission link of the electronic device to said receiver, the first bit rate information relating to said transmission link;

acquire second bit rate information relating to a reception link of the electronic device;

determine a set of properties of said transmission link and said reception link, wherein said set of properties is based on a correlation between said transmission link and said reception link;

determine a combined BRR for the multimedia encoder as a function of said first bit rate information and said second bit rate information, wherein said function depends on said set of properties; and provide said combined BRR to the multimedia encoder; wherein said combined BRR is determined as the minimum of a bit rate request comprised in said first bit rate information and a bit rate request comprised in said second bit rate information in a case said correlation is higher than a predetermined threshold value.

* * * * *